(12) United States Patent
Miyajima

(10) Patent No.: US 12,388,094 B2
(45) Date of Patent: Aug. 12, 2025

(54) POWER GENERATION CELL

(71) Applicant: HONDA MOTOR CO., LTD., Tokyo (JP)

(72) Inventor: Kazuyoshi Miyajima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 860 days.

(21) Appl. No.: 17/665,551

(22) Filed: Feb. 6, 2022

(65) Prior Publication Data

US 2022/0271306 A1 Aug. 25, 2022

(30) Foreign Application Priority Data

Feb. 22, 2021 (JP) ................. 2021-026354

(51) Int. Cl.
*H01M 8/0276* (2016.01)
*H01M 8/0206* (2016.01)
*H01M 8/0258* (2016.01)
*H01M 8/0273* (2016.01)
*H01M 8/0284* (2016.01)
*H01M 8/1004* (2016.01)

(52) U.S. Cl.
CPC ....... *H01M 8/0276* (2013.01); *H01M 8/0206* (2013.01); *H01M 8/0258* (2013.01); *H01M 8/0273* (2013.01); *H01M 8/0284* (2013.01); *H01M 8/1004* (2013.01)

(58) Field of Classification Search
CPC ............. H01M 8/0276; H01M 8/0273; H01M 8/0284; H01M 8/0206; H01M 8/0258; H01M 8/1004
See application file for complete search history.

(56) References Cited

U.S. PATENT DOCUMENTS

| 2017/0222247 A1 | 8/2017 | Sakano et al. |
| 2018/0183073 A1 | 6/2018 | Oku et al. |
| 2019/0131633 A1 | 5/2019 | Ishida et al. |
| 2020/0028188 A1 | 1/2020 | Sasaki et al. |

(Continued)

FOREIGN PATENT DOCUMENTS

| CN | 107710483 A | 2/2018 |
| CN | 110739474 A | 1/2020 |
| CN | 112133939 A | 12/2020 |

(Continued)

OTHER PUBLICATIONS

Office Action dated Nov. 7, 2024 issued in the corresponding Chinese Patent Application No. 202210161656.6 with the English machine translation thereof.

*Primary Examiner* — Basia A Ridley
*Assistant Examiner* — Heng M. Chan
(74) *Attorney, Agent, or Firm* — Carrier, Shende & Associates P.C.; Joseph P. Carrier; Fulchand P. Shende

(57) ABSTRACT

In a power generation cell, a first bypass stop protrusion is integrally formed on a first separator main body so as to protrude from the first separator main body. A second bypass stop protrusion is integrally formed on a second separator main body so as to project from the second separator main body. A first bypass seal member is provided on a protruding end surface of the first bypass stop protrusion so as to be positioned outside the cathode. A second bypass seal member is provided on a protruding end surface of the second bypass stop protrusion so as to be positioned outside the anode.

11 Claims, 7 Drawing Sheets

(56) References Cited

U.S. PATENT DOCUMENTS

2020/0335810 A1  10/2020  Ohmori
2020/0388860 A1  12/2020  Terada et al.

FOREIGN PATENT DOCUMENTS

| JP | 2013-125614 A | | 6/2013 | |
|---|---|---|---|---|
| JP | 2017139218 A | * | 8/2017 | .......... H01M 8/0206 |
| JP | 2019-079736 A | | 5/2019 | |

* cited by examiner

POWER GENERATION CELL

CROSS-REFERENCE TO RELATED APPLICATIONS

This application is based upon and claims the benefit of priority from Japanese Patent Application No. 2021-026354 filed on Feb. 22, 2021, the contents of which are incorporated herein by reference.

BACKGROUND OF THE INVENTION

Field of the Invention

The present invention relates to a power generation cell.

Description of the Related Art

A power generation cell is provided with a membrane electrode assembly (MEA), a resin frame portion, and two separator members. The MEA has an electrolyte membrane and two electrodes arranged on both sides of the electrolyte membrane. The resin frame portion protrudes outward from the outer periphery of the MEA in a state of being attached to the MEA. The two separator members are disposed on both sides of the MEA. Each separator member includes a separator main body in the form of a metal plate. The separator main body has a reactant gas flow field and a flow field seal portion. The reactant gas flow field allows a reactant gas (oxygen-containing gas or fuel gas) to flow from one end of the separator main body toward the other end along the power generation area of each electrode. The flow field seal portion surrounds the reactant gas flow field in a state of being in contact with the resin frame portion to prevent leakage of the reactant gas.

A bypass protrusion for preventing bypassing of the reactant gas is located between an end of the reactant gas flow field in the flow field width direction and the flow field seal portion (bypass flow path), in the separator main body (see, for example, JP 2019-079736 A).

SUMMARY OF THE INVENTION

In this type of power generation cell, it is necessary to effectively suppress the inflow of reactant gas into the bypass flow path.

An object of the present invention is to solve the aforementioned problem.

According to an aspect of the present invention, there is provided a power generation cell including: a membrane electrode assembly including an electrolyte membrane and two electrodes arranged on both sides of the electrolyte membrane; a resin frame portion arranged on an outer periphery of the membrane electrode assembly so as to project outward from the outer periphery; and two separator members arranged on both sides of the membrane electrode assembly, wherein: each of the two separator members includes a separator main body in a form of a metal plate; the separator main body includes: a reactant gas flow field through which a reactant gas flows along a power generation area of the electrode from one end of the separator main body toward another end thereof; and a flow field seal portion that surrounds the reactant gas flow field in a state of being in contact with the resin frame portion in order to prevent leakage of the reactant gas; the flow field seal portion includes a seal bead portion protruding from the separator main body and formed integrally with the separator main body so as to be elastically deformed by a compressive load in a separator thickness direction; the separator main body includes a bypass stop protrusion formed integrally therewith so as to protrude toward the membrane electrode assembly, the bypass stop protrusion being configured to prevent the reactant gas from flowing in between an end portion of the reactant gas flow field in a flow field width direction and the flow field seal portion; and a bypass seal member is provided on a protruding end surface of the bypass stop protrusion so as to be positioned outside the electrode.

According to the present invention, the bypass seal member is provided on the protruding end surface of the bypass stop protrusion so as to be positioned outside the electrode. Therefore, the inflow of the reactant gas into the bypass flow path (i.e., between the end portion of the reactant gas flow field in the flow field width direction and the flow field seal portion) can be effectively suppressed by the bypass stop protrusion and the bypass seal member.

The above and other objects features and advantages of the present invention will become more apparent from the following description when taken in conjunction with the accompanying drawings, in which a preferred embodiment of the present invention is shown by way of illustrative example.

DESCRIPTION OF THE INVENTION

Figure 1:
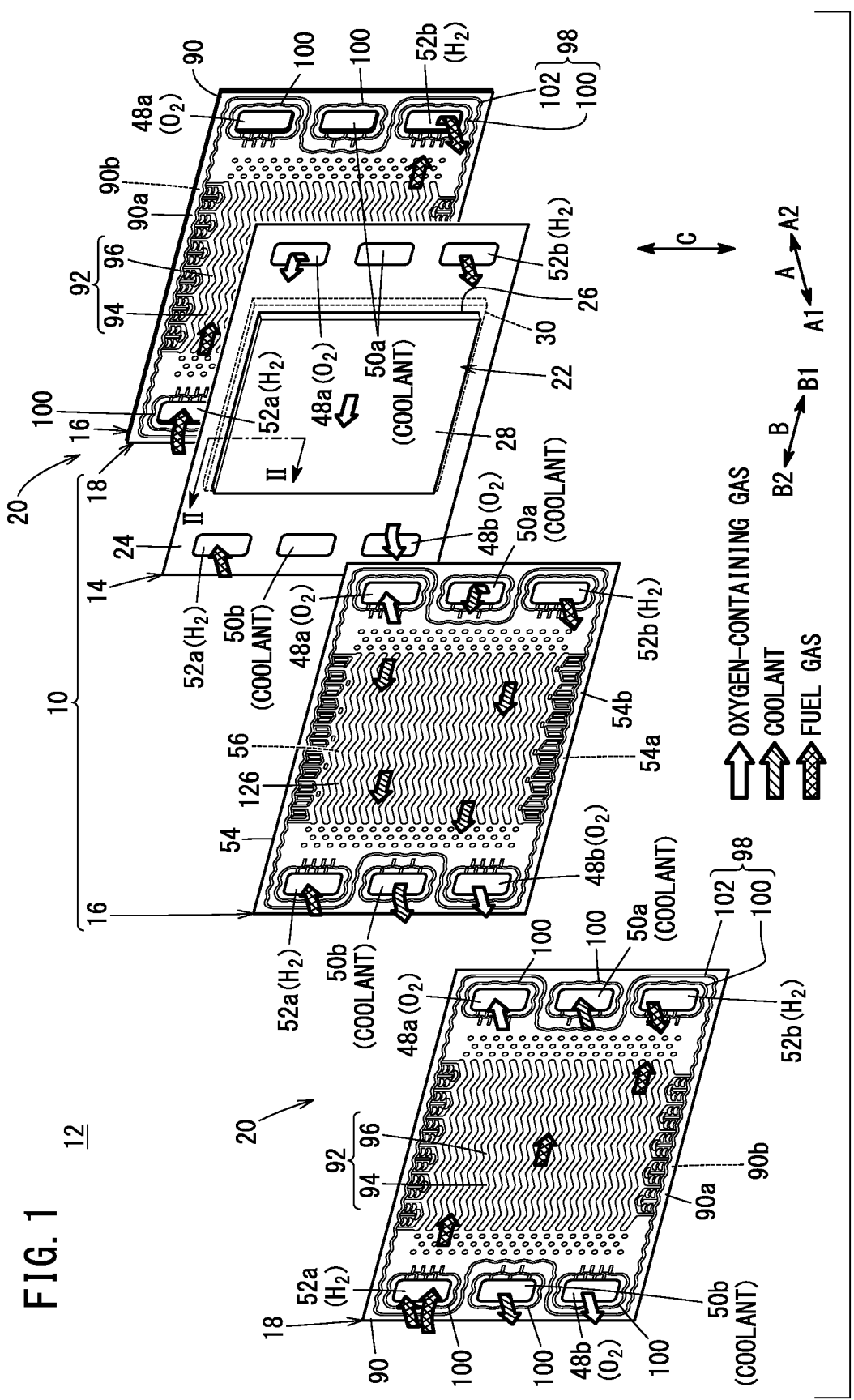
FIG. 1 is an exploded perspective view of a power generation cell according to an embodiment of the present invention.

As shown in FIG. 1, a power generation cell 10 according to an embodiment of the present invention is a unit cell of a fuel cell stack 12. The fuel cell stack 12 includes a plurality of power generation cells 10. The plurality of power generation cells 10 are stacked in the direction of the arrow A. A compressive load in the stacking direction of the plurality of power generation cells 10 is applied to the fuel cell stack 12. For example, the fuel cell stack 12 is mounted in a fuel cell electric vehicle (not shown) as an in-vehicle fuel cell stack.

The power generation cell 10 has a horizontally long rectangular shape. The power generation cell 10 has a resin frame equipped membrane electrode assembly (hereinafter referred to as "resin frame equipped MEA 14"), and a first separator member 16 and a second separator member 18. The resin frame equipped MEA 14 is disposed between the first separator member 16 and the second separator member 18.

Each of the first separator member 16 and the second separator member 18 is formed by press-forming a metal thin plate to have a corrugated shape in cross section and a wavy shape on the surface. The metal thin plate is, for example, a steel plate, a stainless steel plate, an aluminum plate, or a plated steel plate. The metal thin plate may be a stainless steel plate whose surface is surface-treated for anti-corrosion or an aluminum plate whose surface is surface-treated for anti-corrosion. The first separator member 16 and the second separator member 18 are joined to each other by a plurality of joining lines (not shown) to form a joint separator 20.

The resin frame equipped MEA 14 includes a membrane electrode assembly (hereinafter referred to as "MEA 22") and a resin frame portion 24 (resin film). The resin frame portion 24 protrudes outward from an outer periphery of the MEA 22.

Figure 2:
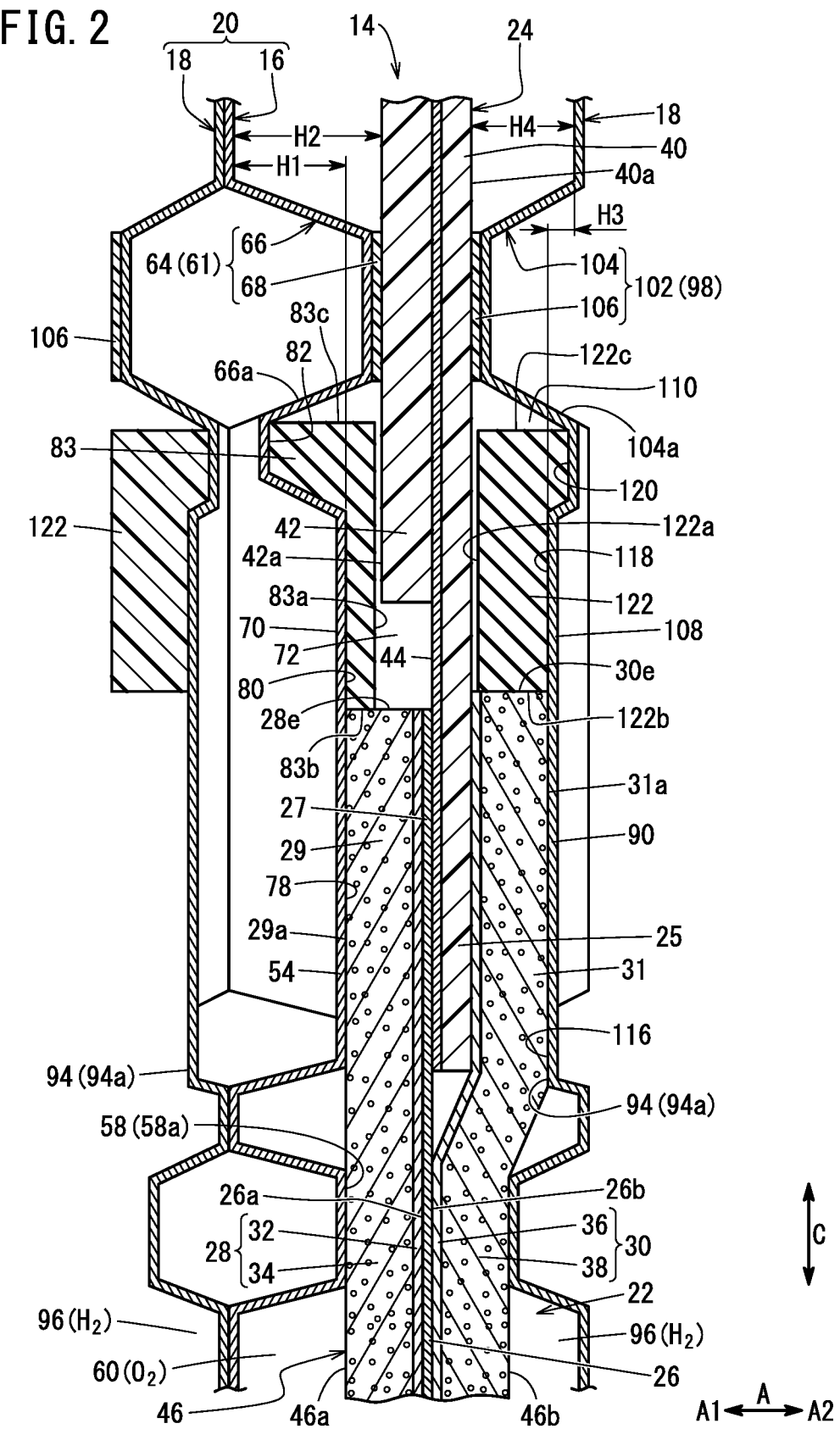
FIG. 2 is a cross-sectional view of the power generation cell taken along line II-II in FIGS. 1 and 4.

As shown in FIG. 2, the MEA 22 has an electrolyte membrane 26, a cathode 28, and an anode 30. The cathode 28 is disposed on one surface 26a of the electrolyte membrane 26. The anode 30 is disposed on the other surface 26b of the electrolyte membrane 26. The electrolyte membrane 26 is, for example, a solid polymer electrolyte membrane (cation exchange membrane). For example, the solid polymer electrolyte membrane is a thin membrane of perfluorosulfonic acid containing water. The electrolyte membrane 26 is sandwiched between the cathode 28 and the anode 30. The electrolyte membrane 26 may be a fluorine-based electrolyte membrane or an HC (hydrocarbon)-based electrolyte.

The cathode 28 has a first electrode catalyst layer 32 and a first gas diffusion layer 34. The first electrode catalyst layer 32 is joined to one surface 26a of the electrolyte membrane 26. The first gas diffusion layer 34 is laminated on the first electrode catalyst layer 32. The anode 30 has a second electrode catalyst layer 36 and a second gas diffusion layer 38. The second electrode catalyst layer 36 is joined to the other surface 26b of the electrolyte membrane 26. The second gas diffusion layer 38 is laminated on the second electrode catalyst layer 36.

The first electrode catalyst layer 32 includes, for example, porous carbon particles having a platinum alloy supported on the surface thereof. The porous carbon particles are uniformly coated on the surface of the first gas diffusion layer 34 together with the ion conductive polymer binder. The second electrode catalyst layer 36 includes, for example, porous carbon particles having a platinum alloy supported on the surface thereof. The porous carbon particles are uniformly coated on the surface of the second gas diffusion layer 38 together with the ion conductive polymer binder. The first gas diffusion layer 34 and the second gas diffusion layer 38 include carbon paper, carbon cloth, or the like.

The resin frame portion 24 is joined to the outer periphery of the MEA 22 and extends to surround the outer periphery (see FIG. 1). The resin frame portion 24 has a first frame-shaped sheet 40 and a second frame-shaped sheet 42. An inner periphery of the first frame-shaped sheet 40 is joined to the outer periphery of the MEA 22. The second frame-shaped sheet 42 is joined to the first frame-shaped sheet 40. The first frame-shaped sheet 40 and the second frame-shaped sheet 42 are joined to each other in the thickness direction by an adhesive layer 44 made of an adhesive. The second frame-shaped sheet 42 is joined to an outer periphery of the first frame-shaped sheet 40. The thickness of the first frame-shaped sheet 40 is smaller than that of the second frame-shaped sheet 42. The resin frame portion 24 may be formed of only the first frame-shaped sheet 40 without joining the second frame-shaped sheet 42 to the first frame-shaped sheet 40.

The first frame-shaped sheet 40 and the second frame-shaped sheet 42 are made of resin material. Examples of the constituent materials of the first frame-shaped sheet 40 and the second frame-shaped sheet 42 include PPS (polyphenylene sulfide), PPA (polyphthalamide), PEN (polyethylene naphthalate), PES (polyether sulfone), LCP (liquid crystal polymer), PVDF (polyvinylidene fluoride), silicone resin, fluororesin, m-PPE (modified polyphenylene ether resin), PET (polyethylene terephthalate), PBT (polybutylene terephthalate), and modified polyolefin.

An inner periphery 25 of the resin frame portion 24 (the inner periphery of the first frame-shaped sheet 40) is disposed between an outer periphery 29 of the cathode 28 and an outer periphery 31 of the anode 30. Specifically, the inner periphery 25 of the resin frame portion 24 is sandwiched between an outer periphery 27 of the electrolyte membrane 26 and the outer periphery 31 of the anode 30. The inner periphery 25 of the resin frame portion 24 and the outer periphery 27 of the electrolyte membrane 26 are joined to each other through the adhesive layer 44. The inner periphery 25 of the resin frame portion 24 may be sandwiched between the outer periphery 27 of the electrolyte membrane 26 and the outer periphery 29 of the cathode 28.

An outer surface 29a of the outer periphery 29 of the cathode 28 is located on the same plane (common plane) as one surface 46a (outer surface facing the first separator member 16) of the power generation area 46 of the MEA 22. An outer surface 31a of the outer periphery 31 of the anode 30 is located on the opposite side (in the direction indicated by arrow A2), with respect to the other surface 46b (the outer surface facing the second separator member 18) of the power generation area 46, from the cathode 28. The outer surface 31a of the outer periphery 31 of the anode 30 is located on the opposite side (in the direction indicated by arrow A2), with respect to an outer surface 40a (the surface opposite to the second frame-shaped sheet 42) of the first frame-shaped sheet 40, from the cathode 28.

The resin frame portion 24 may be a portion in which the electrolyte membrane 26 protrudes outward from the cathode 28 and the anode 30. The resin frame portion 24 may have a protruding portion in which the electrolyte membrane 26 protrudes outward from the cathode 28 and the anode 30, and frame-shaped films attached to both surfaces of the protruding portion.

As shown in FIG. 1, one end edge portion in the long side direction of each power generation cell 10 has an oxygen-containing gas supply passage 48a, a coolant supply passage 50a, and a fuel gas discharge passage 52b. The one end edge portion in the long side direction of each power generation cell 10 is an end edge portion in the arrow B1 direction of each power generation cell 10. The oxygen-containing gas supply passage 48a, the coolant supply passage 50a, and the fuel gas discharge passage 52b are arranged in the short side direction of the power generation cell 10. The short side direction of each power generation cell 10 is along the direction of arrow C.

An oxygen-containing gas (for example, an oxygen-containing gas), which is one of the reactant gases, flows through the oxygen-containing gas supply passage 48a in the direction of arrow A2. A coolant (for example, pure water, ethylene glycol, oil, or the like) flows through the coolant supply passage 50a in the direction of arrow A2. A fuel gas (for example, a hydrogen-containing gas) which is the other reactant gas flows through the fuel gas discharge passage 52b in the direction of the arrow A1.

The other end edge portion in the long side direction of each power generation cell 10 has a fuel gas supply passage 52a, a coolant discharge passage 50b, and an oxygen-containing gas discharge passage 48b. The other end edge portion of each power generation cell 10 in the long-side direction is an end edge portion of each power generation cell 10 in the direction of arrow B2. The fuel gas supply passage 52a, the coolant discharge passage 50b, and the oxygen-containing gas discharge passage 48b are arranged in the direction of the arrow C.

Fuel gas flows through the fuel gas supply passage 52a in the direction indicated by arrow A2. The coolant flows through the coolant discharge passage 50b in the direction of the arrow A1. The oxygen-containing gas flows through the oxygen-containing gas discharge passage 48b in the direction of the arrow A1.

The arrangement, shape, and size of the passages (such as the oxygen-containing gas supply passage 48a) described above are not limited to those in the present embodiment, and may be appropriately set according to required specifications.

Figure 3:
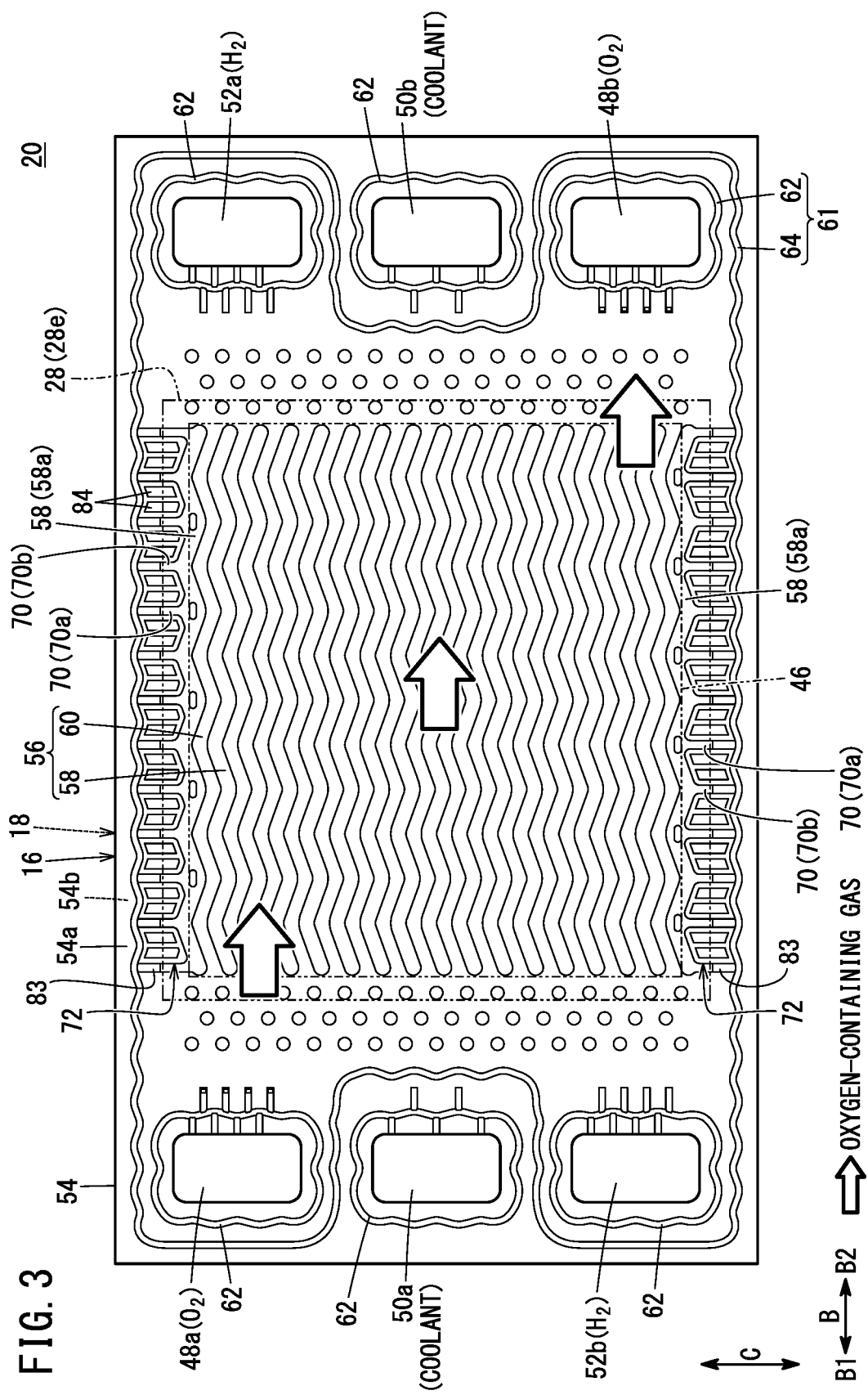
FIG. 3 is a plan view of a joint separator viewed from a first separator member toward a second separator member.

As shown in FIGS. 2 and 3, the first separator member 16 includes a metal plate-shaped first separator main body 54. The first separator main body 54 is formed in a rectangular shape. A surface (hereinafter referred to as "surface 54a") of the first separator main body 54 facing the resin frame equipped MEA 14 has an oxygen-containing gas flow field 56 (reactant gas flow field) extending in the long side direction (arrow B direction) of the power generation cell 10. The oxygen-containing gas flow field 56 is in fluid communication with the oxygen-containing gas supply passage 48a and the oxygen-containing gas discharge passage 48b. The oxygen-containing gas flow field 56 supplies oxygen-containing gas to the cathode 28.

The oxygen-containing gas flow field 56 has a plurality of first flow grooves 60. Each of the first flow grooves 60 is located between a plurality of first flow field protrusions 58 extending in the direction of arrow B. That is, in the oxygen-containing gas flow field 56, the first flow field protrusion 58 and the first flow groove 60 are alternately arranged in the flow field width direction (the direction of arrow C). The first flow field protrusions 58 and the first flow grooves 60 are integrally formed with the first separator main body 54 by press forming. The first flow field protrusions 58 and the first flow grooves 60 extend in a wavy pattern in the direction of arrow B. However, the first flow field protrusions 58 and the first flow grooves 60 may extend linearly in the direction of the arrow B.

In FIG. 2, the first flow field protrusion 58 has a trapezoidal cross-sectional shape. That is, the cross-sectional shape of the first flow field protrusion 58 is tapered toward the protruding direction of the first flow field protrusion 58. The first flow field protrusion 58 may have a rectangular cross-sectional shape. Hereinafter, among the plurality of first flow field protrusions 58, first flow field protrusions 58 located at both ends in the flow field width direction are referred to as "first end flow field protrusions 58a". The first end flow field protrusion 58a is located inside an outer peripheral end face 28e of the cathode 28.

In FIG. 3, the surface 54a of the first separator main body 54 is provided with a first seal portion 61 for preventing leakage of reactant gas (oxygen-containing gas or fuel gas) or a fluid, which is a coolant. The first seal portion 61 is pressed against an outer surface 42a of the second frame-shaped sheet 42 (the outer surface of the second frame-shaped sheet 42 opposite to the first frame-shaped sheet 40) (see FIG. 2). The first seal portion 61 extends in a wavy shape when viewed in the separator thickness direction (direction of arrow A). However, the first seal portion 61 may extend linearly as viewed in the separator thickness direction.

The first seal portion 61 has a plurality of first passage seal portions 62 and a first flow field seal portion 64. The plurality of first passage seal portions 62 respectively surround the plurality of passages (e.g., the oxygen-containing gas supply passage 48a). The first flow field seal portion 64 is located on the outer periphery of the first separator main body 54.

As shown in FIG. 2, the first seal portion 61 includes a first seal bead portion 66 and a first resin seal member 68. The first seal bead portion 66 is integrally formed with the first separator main body 54 so as to project toward the resin frame equipped MEA 14. The first resin seal member 68 is attached to the protruding end surface of the first seal bead portion 66. The first seal bead portion 66 is elastically deformed by a compressive load in the direction of the arrow A.

The first seal bead portion 66 has a trapezoidal cross-sectional shape. That is, the cross-sectional shape of the first seal bead portion 66 is tapered toward the protruding direction of the first seal bead portion 66. The cross-sectional shape of the first seal bead portion 66 may be rectangular. The first resin seal member 68 is a rubber seal that is fixed to the protruding end surface of the first seal bead portion 66 by printing or coating. Examples of the resin material constituting the first resin seal member 68 include polyester fiber, silicone rubber, EPDM (ethylene-propylene-diene rubber), FKM (fluororubber), and the like. The first resin seal member 68 may be fixed to the outer surface 42a of the second frame-shaped sheet 42.

Figure 4:
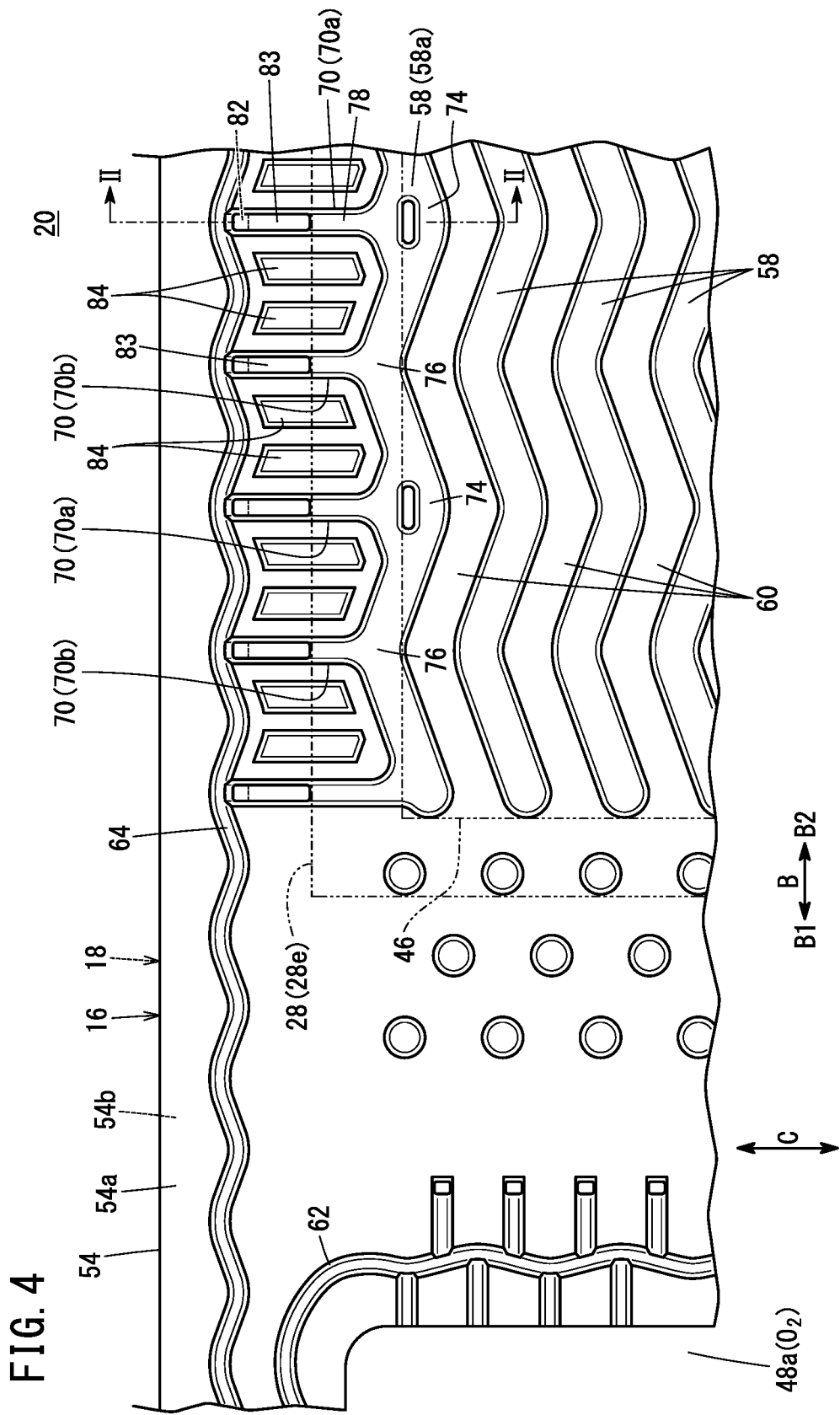
FIG. 4 is an enlarged plan view of a main portion of the first separator member.

In FIGS. 2 and 4, the first separator main body 54 has a plurality of first bypass stop protrusions 70. Each of the first bypass stop protrusions 70 is located between the end portion of the oxygen-containing gas flow field 56 in the flow field width direction (i.e., the first end flow field protrusion 58a) and the first flow field seal portion 64. The first bypass stop protrusions 70 prevent the oxygen-containing gas from bypassing the oxygen-containing gas flow field 56 from the oxygen-containing gas supply passage 48a to the oxygen-containing gas discharge passage 48b. That is, the plurality of first bypass stop protrusions 70 prevent the oxygen-containing gas from entering a first bypass flow path 72. Stated otherwise, the first bypass stop protrusions 70 prevent the oxygen-containing gas from bypassing the oxygen-containing gas flow field 56. The first bypass flow path 72 is located between the first end flow field protrusion 58a and the first flow field seal portion 64.

In this embodiment, the flow field width direction of the oxygen-containing gas flow field 56 is a direction along the short side of the first separator main body 54 (arrow C direction). The plurality of first bypass stop protrusions 70 are integrally formed with the first separator main body 54 by press forming. The plurality of first bypass stop protrusions 70 protrude from the first separator main body 54 toward the resin frame equipped MEA 14. The first bypass stop protrusions 70 are arranged at intervals in the extending direction of the first end flow field protrusion 58a (the direction of arrow B).

Each of the first bypass stop protrusions 70 has a trapezoidal cross-sectional shape (see FIG. 4). That is, the cross-sectional shape of each first bypass stop protrusion 70 is tapered in the protruding direction of the first bypass stop protrusion 70. However, the cross-sectional shape of each first bypass stop protrusion 70 may be a rectangular shape.

The first end flow field protrusion 58a has a plurality of first concave curved portions 74 and a plurality of first convex curved portions 76. Each of the first concave curved portions 74 is curved so as to be recessed in a direction away from the first flow field seal portion 64. Each of the first convex curved portions 76 is curved so as to project toward the first flow field seal portion 64. The first bypass stop protrusions 70 include a plurality of first bypass stop protrusions 70a and a plurality of first bypass stop protrusions 70b. The first bypass stop protrusions 70a are located between the first concave curved portions 74 of the first end flow field protrusion 58a and the first flow field seal portion 64. The first bypass stop protrusions 70b are located between the first convex curved portions 76 of the first end flow field protrusion 58a and the first flow field seal portion 64. The first bypass stop protrusions 70a and the first bypass stop protrusions 70b are alternately arranged at intervals along the extending direction of the first end flow field protrusion 58a.

One end of each of the first bypass stop protrusions 70a is connected to an inner side portion 66a of the first seal bead portion 66. The other end of each of the first bypass stop protrusions 70a is connected to each of the first concave curved portions 74 of the first end flow field protrusion 58a. One end of each of the first bypass stop protrusions 70b is connected to the inner side portion 66a of the first seal bead portion 66. The other end of each of the first bypass stop protrusions 70b is connected to each of the first convex curved portions 76 of the first end flow field protrusion 58a.

The height H1 (the protruding length from the first separator main body 54) of each first bypass stop protrusion 70 is lower than the height H2 of the first flow field seal portion 64 (see FIG. 2). The protruding end surface of each first bypass stop protrusion 70 includes a first inner end surface 78 and a first outer end surface 80. Each first inner end surface 78 faces the outer surface 29a of the outer periphery 29 of the cathode 28. Each first outer end surface 80 is located outside the cathode 28 in a state of being separated from the outer surface 42a of the second frame-shaped sheet 42.

A portion of each first outer end surface 80 adjacent to the inner side portion 66a of the first seal bead portion 66 has a first recessed portion 82. Each of the first recessed portions 82 is recessed in a direction away from the resin frame portion 24. That is, the back surface (coolant surface) of each first recessed portion 82 protrudes in a direction away from the resin frame portion 24. As a result, the rigidity of the inner side portion 66a of the first flow field seal portion 64 can be reduced, compared to the case where each first bypass stop protrusion 70 does not have the first recessed portion 82. Therefore, since the first seal bead portion 66 can be effectively elastically deformed by a compressive load, an appropriate seal surface pressure can be applied to the seal surface (first resin seal member 68) of the first flow field seal portion 64.

A first bypass seal member 83 is attached to the first outer end surface 80 of each first bypass stop protrusion 70. Each first bypass seal member 83 is a rubber seal fixed to the first outer end surface 80 by printing, coating, or the like. The resin material constituting each first bypass seal member 83 may include the same material as the materials constituting the first resin seal member 68 and a second resin seal member 106 described above. In other words, each first bypass seal member 83 is made of a rubber material. The first bypass seal member 83 is made of the same material as the first resin seal member 68. In this case, for example, when the resin material is applied to the protruding end surface of the first seal bead portion 66, the resin material can also be applied to the first outer end surface 80. Therefore, the first bypass seal member 83 can be efficiently attached to the first outer end surface 80 of each first bypass stop protrusion 70.

In FIG. 2, each first bypass seal member 83 is attached to the entire first outer end surface 80. In other words, each first bypass seal member 83 is also attached to the bottom surface of each first recessed portion 82. An outer surface 83a of each first bypass seal member 83 facing the resin frame portion 24 is close to the outer surface 42a of the second frame-shaped sheet 42. There is a slight gap between the outer surface 83a and the outer surface 42a. Thus, since a compressive load is prevented from acting on the plurality of first bypass seal members 83, an appropriate sealing surface pressure can be applied to the sealing surface of the first flow field seal portion 64.

However, the outer surface 83a of each first bypass seal member 83 may contact the outer surface 42a of the second frame-shaped sheet 42. Even in this case, since each of the first bypass seal members 83 is made of a rubber material (i.e., being more easily elastically deformed than the first seal bead portion 66), it is possible to suppress a large decrease in the sealing surface pressure of the first flow field seal portion 64.

An outer surface 83b of each first bypass seal member 83 facing the MEA 22 is in contact with or close to the outer peripheral end face 28e of the cathode 28. An outer surface 83c of each first bypass seal member 83 on the side opposite to the MEA 22 is spaced apart from the inner side portion 66a of the first seal bead portion 66. Thus, when a compressive load is applied to the plurality of power generation cells 10, elastic deformation of the inner side portion 66a of the first seal bead portion 66 is not inhibited by the plurality of first bypass seal members 83.

The plurality of first bypass seal members 83 are not necessarily attached to all of the first bypass stop protrusions 70. The plurality of first bypass seal members 83 may be provided at least in a first bypass stop protrusion 70 closest to the inlet of the oxygen-containing gas flow field 56 among the plurality of first bypass stop protrusions 70.

In FIG. 4, a plurality of first intermediate protrusions 84 for supporting the outer periphery of the MEA 22 are located between the first bypass stop protrusions 70 adjacent to each other. Each of the first intermediate protrusions 84 protrudes from the first separator main body 54 toward the resin frame equipped MEA 14. Each of the first intermediate protrusions 84 extends in a direction intersecting the extending direction of the first end flow field protrusion 58a. Each of the first intermediate protrusions 84 is disposed at a position overlapping the outer peripheral end face 28e of the cathode 28 when viewed from the stacking direction.

Figure 5:
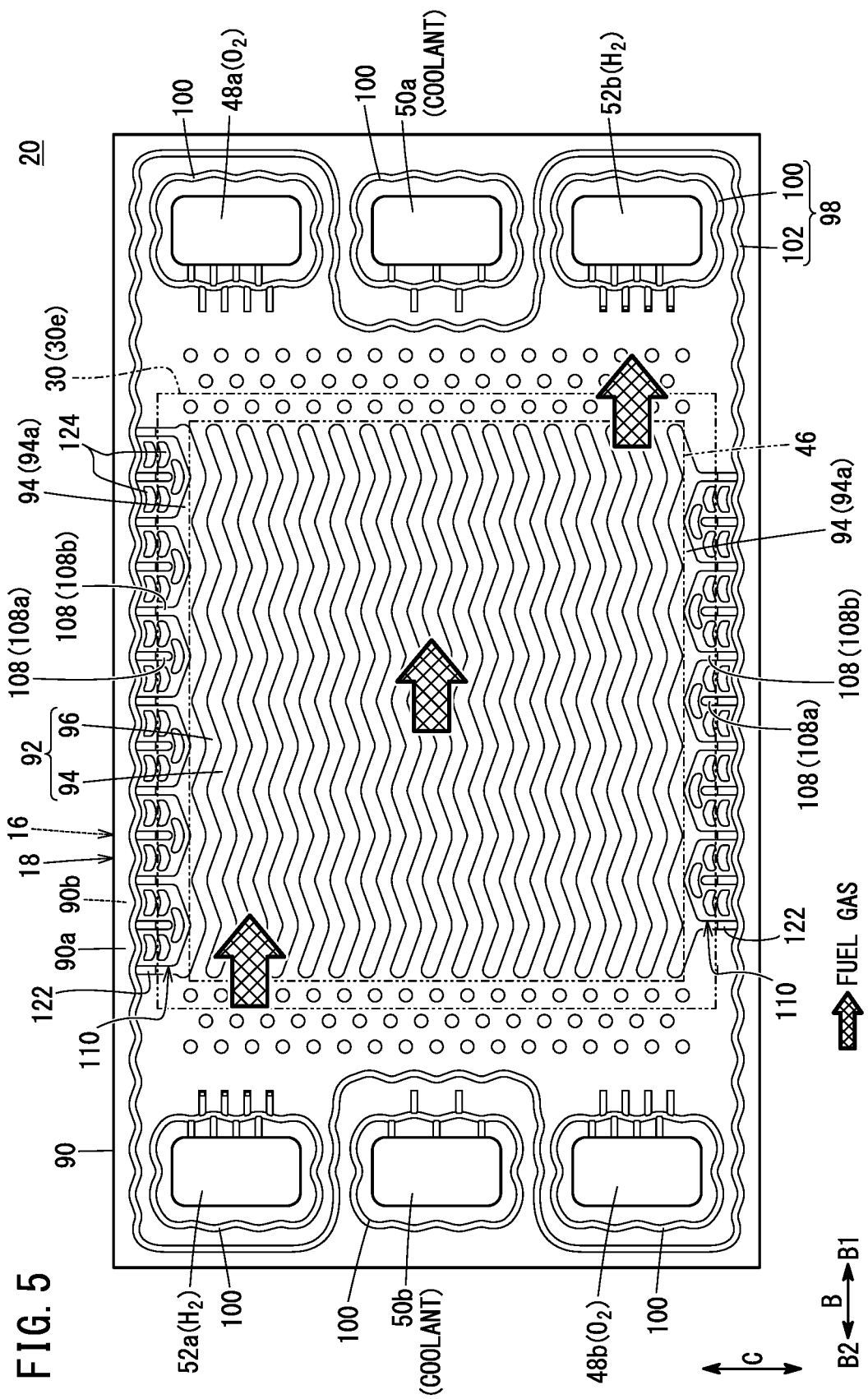
FIG. 5 is a plan view of the joint separator viewed from the second separator member toward the first separator member.

As shown in FIGS. 1, 2, and 5, the second separator member 18 includes a metal plate-shaped second separator main body 90. The second separator main body 90 is formed in a rectangular shape. A surface (hereinafter referred to as "surface 90a") of the second separator main body 90 facing the resin frame equipped MEA 14 has a fuel gas flow field 92 (reactant gas flow field) extending in the long side direction (arrow B direction) of the power generation cell 10. The fuel gas flow field 92 is in fluid communication with the fuel gas supply passage 52a and the fuel gas discharge passage 52b. The fuel gas flow field 92 supplies fuel gas to the anode 30.

The fuel gas flow field 92 has a plurality of second flow grooves 96. Each second flow groove 96 is located between a plurality of second flow field protrusions 94 extending in the direction of arrow B. That is, in the fuel gas flow field 92, the second flow field protrusion 94 and the second flow groove 96 are alternately arranged in the flow path width direction (arrow C direction). The plurality of second flow field protrusions 94 and the plurality of second flow grooves 96 are integrally formed with the second separator main body 90 by press forming. The second flow field protrusions 94 and the second flow grooves 96 extend in a wavy manner in the direction of arrow B. However, the second flow field protrusions 94 and the second flow grooves 96 may extend linearly in the direction of the arrow B.

In FIG. 2, the cross-sectional shape of the second flow field protrusion 94 is a trapezoidal shape. That is, the cross-sectional shape of the second flow field protrusion 94 is tapered toward the protruding direction of the second flow field protrusion 94. The cross-sectional shape of the second flow field protrusion 94 may be rectangular. Hereinafter, among the plurality of second flow field protrusions 94, second flow field protrusions 94 located at both ends in the flow field width direction will be referred to as "second end flow field protrusions 94*a*". The second end flow field protrusion 94*a* is located inside an outer peripheral end face 30*e* of the anode 30.

In FIG. 5, the surface 90*a* of the second separator main body 90 is provided with a second seal portion 98 for preventing leakage of a reactant gas (oxygen-containing gas or fuel gas) or a fluid serving as a coolant. The second seal portion 98 is pressed against the outer surface 40*a* of the first frame-shaped sheet 40 (the outer surface of the first frame-shaped sheet 40 opposite to the second frame-shaped sheet 42) (see FIG. 2). The second seal portion 98 extends in a wavy shape when viewed in the separator thickness direction (direction of arrow A). However, the second seal portion 98 may extend linearly as viewed in the separator thickness direction.

The second seal portion 98 has a plurality of second passage seal portions 100 and a second flow field seal portion 102. The plurality of second passage seal portions 100 respectively surround the plurality of passages (e.g., the oxygen-containing gas supply passage 48*a*). The second flow field seal portion 102 is located on the outer periphery of the second separator main body 90. The second seal portion 98 is disposed so as to overlap the first seal portion 61 when viewed from the separator thickness direction (see FIG. 2).

As shown in FIG. 2, the second seal portion 98 includes a second seal bead portion 104 and a second resin seal member 106. The second seal bead portion 104 is integrally formed with the second separator main body 90 so as to project toward the resin frame equipped MEA 14. The second resin seal member 106 is attached to the protruding end surface of the second seal bead portion 104. The second seal bead portion 104 is elastically deformed by a compressive load in the direction of the arrow A.

The second seal bead portion 104 has a trapezoidal cross-sectional shape. That is, the cross-sectional shape of the second seal bead portion 104 is tapered toward the protruding direction of the second seal bead portion 104. The cross-sectional shape of the second seal bead portion 104 may be a rectangular shape. The second resin seal member 106 is a rubber seal that is fixed to the protruding end surface of the second seal bead portion 104 by printing, coating, or the like. The resin material constituting the second resin seal member 106 may be the same as the material constituting the first resin seal member 68 described above. The second resin seal member 106 may be fixed to the outer surface 40*a* of the first frame-shaped sheet 40.

Figure 6:
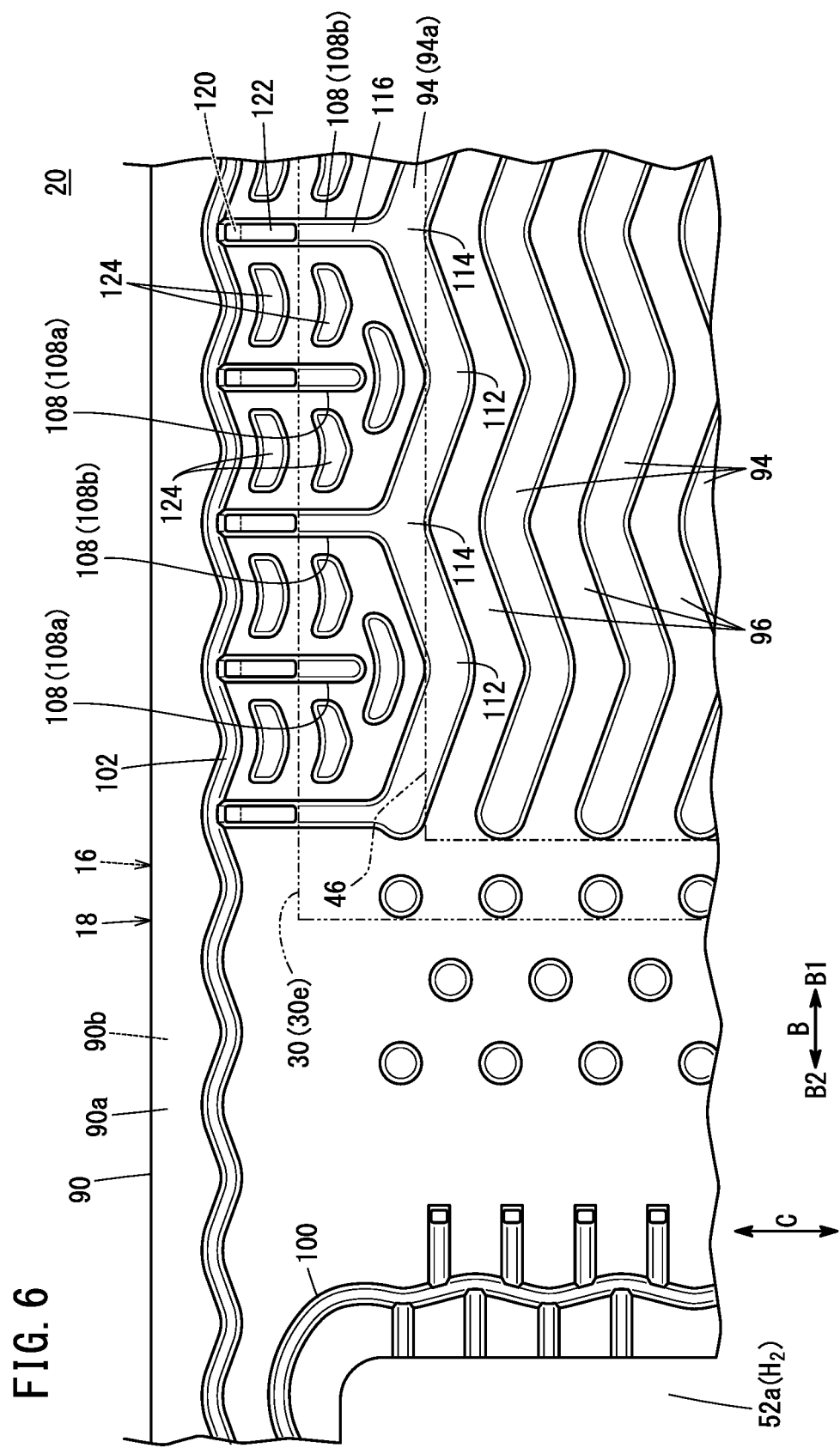
FIG. 6 is an enlarged plan view of a main portion of the second separator member.

In FIGS. 2 and 6, the second separator main body 90 has a plurality of second bypass stop protrusions 108. Each of the plurality of second bypass stop protrusions 108 is located between the end portion of the fuel gas flow field 92 in the flow field width direction (i.e., the second end flow field protrusion 94*a*) and the second flow field seal portion 102. The plurality of second bypass stop protrusions 108 prevent the fuel gas from bypassing the fuel gas flow field 92 from the fuel gas supply passage 52*a* to the fuel gas discharge passage 52*b*. That is, the plurality of second bypass stop protrusions 108 prevent the fuel gas from entering a second bypass flow path 110. Stated otherwise, the second bypass stop protrusions 108 prevent the fuel gas from bypassing the fuel gas flow field 92. The second bypass flow path 110 is located between the second end flow field protrusion 94*a* and the second flow field seal portion 102.

In this embodiment, the flow field width direction of the fuel gas flow field 92 is a direction along the short side of the second separator main body 90 (arrow C direction). The plurality of second bypass stop protrusions 108 are integrally formed with the second separator main body 90 by press forming. The plurality of second bypass stop protrusions 108 protrude from the second separator main body 90 toward the resin frame equipped MEA 14. The second bypass stop protrusions 108 are arranged at intervals in the extending direction of the second end flow field protrusion 94*a* (the direction of arrow B).

Each of the second bypass stop protrusions 108 has a trapezoidal cross-sectional shape (see FIG. 6). That is, the cross-sectional shape of each second bypass stop protrusion 108 is tapered in the protruding direction of the second bypass stop protrusion 108. However, the cross-sectional shape of each second bypass stop protrusion 108 may be a rectangular shape.

The second end flow field protrusion 94*a* has a plurality of second concave curved portions 112 and a plurality of second convex curved portions 114. Each of the second concave curved portions 112 is curved so as to be recessed in a direction away from the second flow field seal portion 102. Each of the second convex curved portions 114 is curved so as to project toward the second flow field seal portion 102. The second bypass stop protrusions 108 include a plurality of second bypass stop protrusions 108*a* and a plurality of second bypass stop protrusions 108*b*. The second bypass stop protrusions 108*a* are located between the second concave curved portions 112 of the second end flow field protrusion 94*a* and the second flow field seal portion 102. The second bypass stop protrusions 108*b* are located between the second convex curved portions 114 of the second end flow field protrusion 94*a* and the second flow field seal portion 102. The second bypass stop protrusions 108*a* and the second bypass stop protrusions 108*b* are alternately arranged at intervals along the extending direction of the second end flow field protrusion 94*a*.

One end of each of the second bypass stop protrusions 108*a* is connected to an inner side portion 104*a* of the second seal bead portion 104. The other end of each of the second bypass stop protrusions 108*a* is separated from each of the second concave curved portions 112 of the second end flow field protrusion 94*a*. One end of each of the second bypass stop protrusions 108*b* is connected to the inner side portion 104*a* of the second seal bead portion 104. The other end of each of the second bypass stop protrusions 108*b* is connected to each of the second convex curved portions 114 of the second end flow field protrusion 94*a*.

The height H3 (the protruding length from the second separator main body 90) of each second bypass stop protrusion 108 is lower than the height H4 of the second flow field seal portion 102 (see FIG. 2). The protruding end surface of each second bypass stop protrusion 108 includes a second inner end surface 116 and a second outer end surface 118. Each second inner end surface 116 faces the outer surface 31*a* of the outer periphery 31 of the anode 30. Each of the second outer end surfaces 118 is located outside the anode 30 in a state of being separated from the outer surface 40*a* of the first frame-shaped sheet 40.

A portion of each second outer end surface 118 adjacent to the inner side portion 104*a* of the second seal bead portion 104 has a second recessed portion 120. Each of the second recessed portions 120 is recessed in a direction away from the resin frame portion 24. That is, the back surface (coolant surface) of each second recessed portion 120 protrudes in a direction away from the resin frame portion 24. As a result, the rigidity of the side wall of the second flow field seal portion 102 can be reduced, compared to the case where each second bypass stop protrusion 108 does not have the second recessed portion 120. Accordingly, since the inner side portion 104*a* of the second seal bead portion 104 can be effectively elastically deformed by a compressive load, an appropriate sealing surface pressure can be applied to the sealing surface (second resin seal member 106) of the second flow field seal portion 102.

A second bypass seal member 122 is attached to the second outer end surface 118 of each second bypass stop protrusion 108. Each second bypass seal member 122 is a rubber seal fixed to the second outer end surface 118 by printing, coating, or the like. The resin material constituting each second bypass seal member 122 may include the same material as the materials constituting the first resin seal member 68 and the second resin seal member 106 described above. In other words, each second bypass seal member 122 is made of a rubber material. The constituent material of each second bypass seal member 122 is the same as that of the second resin seal member 106. In this case, for example, when the resin material is applied to the protruding end surface of the second seal bead portion 104, the resin material can also be applied to the second outer end surface 118. Therefore, the second bypass seal member 122 can be efficiently attached to the second outer end surface 118 of each second bypass stop protrusion 108.

In FIG. 2, each second bypass seal member 122 is attached to the entire second outer end surface 118. In other words, each second bypass seal member 122 is also attached to the bottom surface of each second recessed portion 120. An outer surface 122*a* of each second bypass seal member 122 facing the resin frame portion 24 is close to the outer surface 40*a* of the first frame-shaped sheet 40. There is a slight gap between the outer surface 122*a* and the outer surface 40*a*. Thus, since a compressive load is prevented from acting on the plurality of second bypass seal members 122, an appropriate sealing surface pressure can be applied to the sealing surface of the second flow field seal portion 102.

However, the outer surface 122*a* of each second bypass seal member 122 may contact the outer surface 40*a* of the first frame-shaped sheet 40. Even in this case, since each of the second bypass seal members 122 is made of a rubber material (i.e., being more easily elastically deformed than the second seal bead portion 104), it is possible to suppress a large decrease in the sealing surface pressure of the second flow field seal portion 102.

The outer surface 122*b* of each second bypass seal member 122 facing the MEA 22 is in contact with or close to the outer peripheral end face 30*e* of the anode 30. An outer surface 122*c* of each second bypass seal member 122 on the side opposite to the MEA 22 is spaced apart from the inner side portion 104*a* of the second seal bead portion 104. Thus, when a compressive load is applied to the plurality of power generation cells 10, elastic deformation of the inner side portion 104*a* of the second seal bead portion 104 is not inhibited by the plurality of second bypass seal members 122.

The plurality of second bypass seal members 122 are not necessarily attached to all of the second bypass stop protrusions 108. The plurality of second bypass seal members 122 may be provided at least in a second bypass stop protrusion 108 closest to the inlet of the fuel gas flow field 92 among the plurality of second bypass stop protrusions 108.

In FIG. 6, a plurality of second intermediate protrusions 124 for supporting the outer periphery of the MEA 22 are located between the second bypass stop protrusions 108 adjacent to each other. Each of the second intermediate protrusions 124 protrudes from the second separator main body 90 toward the resin frame equipped MEA 14. Each of the second intermediate protrusions 124 is disposed at a position overlapping the outer periphery 31 and the outer peripheral end face 30*e* of the anode 30 when viewed from the stacking direction.

Figure 7:
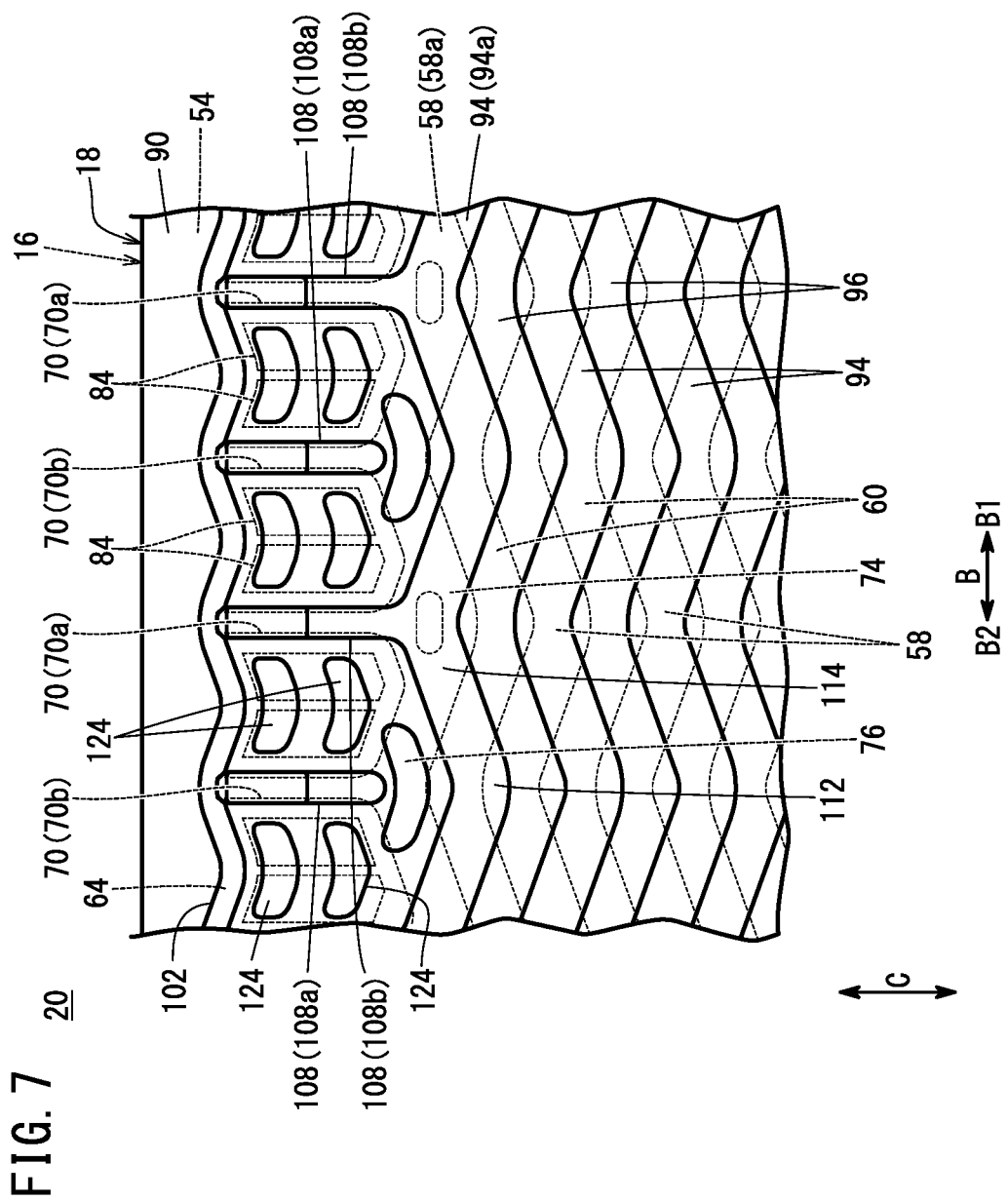
FIG. 7 is a view showing a state in which the second separator member is stacked on the first separator member.

As shown in FIG. 7, when viewed from the stacking direction, the first flow field protrusion 58 of the oxygen-containing gas flow field 56 and the second flow field protrusion 94 of the fuel gas flow field 92 have wave shapes having the same wavelength and opposite phases to each other. The plurality of second bypass stop protrusions 108 overlap the plurality of first bypass stop protrusions 70 respectively, when viewed from the stacking direction.

As shown in FIG. 1, a coolant flow field 126 is located between a surface 54*b* of the first separator main body 54 and the surface 90*b* of the second separator main body 90 which are joined to each other. The coolant flow field 126 is in fluid communication with the coolant supply passage 50*a* and the coolant discharge passage 50*b*. The coolant flow field 126 is formed by stacking the corrugated back surface of the first separator main body 54 and the corrugated back surface of the second separator main body 90.

The power generation cell 10, which is configured as described above, operates in the following manner.

First, as shown in FIG. 1, the oxygen-containing gas is supplied to the oxygen-containing gas supply passage 48*a*. The fuel gas is supplied to the fuel gas supply passage 52*a*. The coolant is supplied to the coolant supply passage 50*a*.

The oxygen-containing gas is introduced into the oxygen-containing gas flow field 56 of the first separator member 16 through the oxygen-containing gas supply passage 48*a*. Then, as shown in FIG. 3, the oxygen-containing gas flows in the direction of arrow B along the oxygen-containing gas flow field 56 and is supplied to the cathode 28 of the MEA 22.

On the other hand, as shown in FIG. 1, the fuel gas is introduced into the fuel gas flow field 92 of the second separator member 18 through the fuel gas supply passage 52*a*. As shown in FIG. 5, the fuel gas flows in the direction of arrow B along the fuel gas flow field 92 and is supplied to the anode 30 of the MEA 22.

Therefore, in each MEA 22, the oxygen-containing gas supplied to the cathode 28 and the fuel gas supplied to the anode 30 are consumed by the electrochemical reaction in the first electrode catalyst layer 32 and the second electrode catalyst layer 36. As a result, power generation is performed.

Then, as shown in FIG. 1, the oxygen-containing gas supplied to and consumed by the cathode 28 flows from the oxygen-containing gas flow field 56 to the oxygen-containing gas discharge passage 48*b*. After having flowed into the oxygen-containing gas discharge passage 48*b*, the oxygen-containing gas is discharged along the oxygen-containing gas discharge passage 48*b* in the direction of arrow A. Similarly, the fuel gas supplied to and consumed by the anode 30 flows from the fuel gas flow field 92 to the fuel gas discharge passage 52*b*. After having flowed into the fuel gas discharge passage 52*b*, the fuel gas is discharged along the fuel gas discharge passage 52*b* in the direction of arrow A.

The coolant supplied to the coolant supply passage 50*a* is introduced into a coolant flow field 126 formed between the first separator main body 54 and the second separator main body 90. The coolant flows in the direction of arrow B after being introduced into the coolant flow field 126. After cooling the MEA 22, the coolant is discharged from the coolant discharge passage 50*b*.

The present embodiment has the following effects.

The first bypass seal members 83 are attached to the protruding end surfaces of the first bypass stop protrusions 70 so as to be positioned outside the cathode 28. The second bypass seal members 122 are attached to the protruding end surfaces of the second bypass stop protrusions 108 so as to be positioned outside the anode 30.

According to this configuration, the inflow of the oxygen-containing gas into the first bypass flow path 72 can be effectively suppressed by the plurality of first bypass stop protrusions 70 and the plurality of first bypass seal members 83. Thus, it is possible to suppress a decrease in the flow rate of the oxygen-containing gas flowing through the oxygen-containing gas flow field 56. Therefore, even when liquid water generated by the cathode 28 at the time of power generation stagnates in the oxygen-containing gas flow field 56, the liquid water in the oxygen-containing gas flow field 56 can be smoothly discharged by the oxygen-containing gas.

Further, the inflow of the fuel gas into the second bypass flow path 110 can be effectively suppressed by the plurality of second bypass stop protrusions 108 and the plurality of second bypass seal members 122. Thus, it is possible to suppress a decrease in the flow rate of the fuel gas flowing through the fuel gas flow field 92. Therefore, even when liquid water generated by the cathode 28 at the time of power generation diffuses back into the anode 30 and stagnates in the fuel gas flow field 92, the liquid water in the fuel gas flow field 92 can be smoothly discharged by the fuel gas. Therefore, power generation can be stabilized.

The protruding end surface of each first bypass stop protrusion 70 includes the first inner end surface 78 and the first outer end surface 80. The first inner end surface 78 faces the outer periphery 29 of the cathode 28. The first outer end surface 80 is located outside the cathode 28 in a state of being separated from the resin frame portion 24. The first bypass seal members 83 are respectively attached to the first outer end surfaces 80.

There are cases where a gap may be formed between the outer surface 29*a* of the outer periphery 29 of the cathode 28 and the first inner end surfaces 78 of the first bypass stop protrusions 70 due to dimensional variation of the resin frame portion 24 and the first bypass stop protrusions 70.

According to such a configuration, even when such a gap occurs, the inflow of the oxygen-containing gas into the first bypass flow path 72 through the gap can be suppressed by the plurality of first bypass seal members 83.

The protruding end surface of each second bypass stop protrusion 108 includes the second inner end surface 116 and the second outer end surface 118. The second inner end surface 116 faces the outer periphery 31 of the anode 30. The second outer end surface 118 is located outside the anode 30 in a state of being separated from the resin frame portion 24. The plurality of second bypass seal members 122 are attached to the plurality of second outer end surfaces 118

There are cases where a gap may be formed between the outer surface 31*a* of the outer periphery 31 of the anode 30 and the second inner end surfaces 116 of the second bypass stop protrusions 108 due to dimensional variation of the resin frame portion 24 and the second bypass stop protrusions 108. According to such a configuration, even when such a gap occurs, the inflow of the fuel gas into the second bypass flow path 110 through the gap can be suppressed by the plurality of second bypass seal members 122.

Each first bypass seal member 83 is in contact with or adjacent to the cathode 28. Each second bypass seal member 122 is in contact with or adjacent to the anode 30.

According to this configuration, the inflow of the oxygen-containing gas into the first bypass flow path 72 can be more effectively suppressed by the plurality of first bypass seal members 83. Further, the inflow of fuel gas into the second bypass flow path 110 can be more effectively suppressed by the plurality of second bypass seal members 122.

Each first bypass seal member 83 is located between the outer periphery 29 of the cathode 28 and the inner side portion 66*a* of the first seal bead portion 66. Each second bypass seal member 122 is located between the outer periphery 31 of the anode 30 and the inner side portion 104*a* of the second seal bead portion 104.

According to this configuration, the inflow of the oxygen-containing gas into the first bypass flow path 72 can be more effectively suppressed by the plurality of first bypass seal members 83. Further, the inflow of fuel gas into the second bypass flow path 110 can be more effectively suppressed by the plurality of second bypass seal members 122.

Each first bypass seal member 83 is made of a rubber material. Each of the second bypass seal members 122 is made of a rubber material.

According to this configuration, the inflow of the oxygen-containing gas into the first bypass flow path 72 can be more effectively suppressed by the plurality of first bypass seal members 83. Further, the inflow of fuel gas into the second bypass flow path 110 can be more effectively suppressed by the plurality of second bypass seal members 122.

Each first bypass seal member 83 is proximate to the outer surface 42*a* of the second frame-shaped sheet 42. Each second bypass seal member 122 is adjacent to the outer surface 40*a* of the first frame-shaped sheet 40.

According to this configuration, the inflow of the oxygen-containing gas into the first bypass flow path 72 can be more effectively suppressed by the plurality of first bypass seal members 83. Further, the inflow of fuel gas into the second bypass flow path 110 can be more effectively suppressed by the plurality of second bypass seal members 122.

The first flow field seal portion 64 includes the first resin seal member 68 attached to the protruding end surface of the first seal bead portion 66. The material for the first bypass seal member 83 is the same as that for the first resin seal member 68. The second flow field seal portion 102 includes the second resin seal member 106 attached to the protruding end surface of the second seal bead portion 104. The material for the second bypass seal member 122 is the same as that for the second resin seal member 106.

According to this configuration, when a resin material constituting the first resin seal member 68 is attached to the protruding end surface of the first seal bead portion 66, the resin material can also be attached to the first outer end surface 80, so that the first bypass seal member 83 can be efficiently formed. When a resin material constituting the second resin seal member 106 is attached to the protruding end surface of the second seal bead portion 104, the resin material can also be attached to the second outer end surface 118, so that the second bypass seal member 122 can be efficiently formed.

The plurality of first bypass stop protrusions 70 are arranged in the flow direction of the oxygen-containing gas in the oxygen-containing gas flow field 56. The first bypass seal member 83 is attached to at least a first bypass stop protrusion 70 closest to the inlet of the oxygen-containing gas flow field 56 among the plurality of first bypass stop protrusions 70. The plurality of second bypass stop protrusions 108 are arranged in the flow direction of the fuel gas in the fuel gas flow field 92. The second bypass seal member 122 is attached to at least a second bypass stop protrusion 108 closest to the inlet of the fuel gas flow field 92 among the plurality of second bypass stop protrusions 108.

According to such a configuration, it is possible to effectively prevent the oxygen-containing gas from flowing into the first bypass flow path 72 from the upstream side of the oxygen-containing gas flow field 56. Further, it is possible to effectively prevent the fuel gas from flowing into the second bypass flow path 110 from the upstream side of the fuel gas flow field 92.

The first bypass stop protrusions 70 extend so as to connect the first end flow field protrusion 58a and the inner side portion 66a of the first seal bead portion 66. The first recessed portion 82 is located in a portion of the first outer end surface 80 adjacent to the first seal bead portion 66. The second bypass stop protrusions 108 extend so as to connect the second end flow field protrusion 94a and the inner side portion 104a of the second seal bead portion 104. The second recessed portion 120 is located at a portion of the second outer end surface 118 adjacent to the second seal bead portion 104.

According to such a configuration, since the rigidity of the inner side portion 66a of the first seal bead portion 66 can be reduced as compared with the case where the first recessed portion 82 is not provided, the first seal bead portion 66 can be easily elastically deformed by a compressive load. Further, since the rigidity of the inner side portion 104a of the second seal bead portion 104 can be reduced as compared with the case where the second recessed portion 120 is not provided, the second seal bead portion 104 can be easily elastically deformed by a compressive load.

The present embodiment is not limited to the configuration described above. In the power generation cell 10, the plurality of first bypass seal members 83 or the plurality of second bypass seal members 122 may be omitted. In other words, the power generation cell 10 may have only the plurality of first bypass seal members 83 or only the plurality of second bypass seal members 122.

The present invention is not limited to the above-described embodiments, and various configurations may be adopted without departing from the scope of the present invention.

The embodiment described above can be summarized in the following manner.

According to the above embodiment, there is provided a power generation cell (10) including: a membrane electrode assembly (22) including an electrolyte membrane (26) and two electrodes (28, 30) arranged on both sides of the electrolyte membrane; a resin frame portion (24) arranged on an outer periphery of the membrane electrode assembly so as to project outward from the outer periphery; and two separator members (16, 18) arranged on both sides of the membrane electrode assembly, wherein: each of the two separator members includes a separator main body (54, 90) in a form of a metal plate; the separator main body includes: a reactant gas flow field (56, 92) through which a reactant gas flows along a power generation area (46) of the electrode from one end of the separator main body toward another end thereof; and a flow field seal portion (64, 102) that surrounds the reactant gas flow field in a state of being in contact with the resin frame portion in order to prevent leakage of the reactant gas; the flow field seal portion includes a seal bead portion (66, 104) protruding from the separator main body and formed integrally with the separator main body so as to be elastically deformed by a compressive load in a separator thickness direction; the separator main body includes a bypass stop protrusion (70, 108) formed integrally therewith so as to protrude toward the membrane electrode assembly, the bypass stop protrusion being configured to prevent the reactant gas from flowing in between an end portion (58a, 94a) of the reactant gas flow field in a flow field width direction and the flow field seal portion; and a bypass seal member (83, 122) is provided on a protruding end surface of the bypass stop protrusion so as to be positioned outside the electrode.

In the power generation cell, the protruding end surface of the bypass stop protrusion may include: an inner end surface (78, 116) facing an outer periphery of the electrode; and an outer end surface (80, 118) positioned outside the electrode in a state of being separated from the resin frame portion; and the bypass seal member may be provided on the outer end surface.

In the power generation cell, the bypass seal member may be in contact with or in proximity to one of the two electrodes.

In the power generation cell, the bypass seal member may be located between the outer periphery of one of the two electrodes and an inner side portion (66a, 104a) of the seal bead portion.

In the power generation cell, the bypass seal member may be made of a rubber material.

In the power generation cell described above, the bypass seal member may be close to the outer surface (40a, 42a) of the resin frame portion.

In the power generation cell, the flow field seal portion may include a resin seal member (68, 106) provided on a protruding end surface of the seal bead portion, and a constituent material for the bypass seal member may be the same as a constituent material for the resin seal member.

In the power generation cell, the plurality of bypass stop protrusions may be provided in a flow direction of the reactant gas in the reactant gas flow field, and the bypass seal member may be provided on at least a bypass stop protrusion, among the plurality of bypass stop protrusions, that is closest to an inlet of the reactant gas flow field.

In the power generation cell, the bypass stop protrusion may extend so as to connect the end portion of the reactant gas flow field in the flow field width direction and an inner side portion of the seal bead portion, and a portion of the protruding end surface that is adjacent to the inner side portion of the seal bead portion may include a recessed portion (82, 120).

What is claimed is:

1. A power generation cell comprising: a membrane electrode assembly including an electrolyte membrane and two electrodes arranged on both sides of the electrolyte membrane; a resin frame portion arranged on an outer periphery of the membrane electrode assembly so as to project outward from the outer periphery; and two separator members arranged on both sides of the membrane electrode assembly, wherein:
    each of the two separator members includes a separator main body in a form of a metal plate;
    the separator main body includes:
    a reactant gas flow field through which a reactant gas flows along a power generation area of the electrode from one end of the separator main body toward another end thereof; and
    a flow field seal portion that surrounds the reactant gas flow field in a state of being in contact with the resin frame portion to prevent leakage of the reactant gas;
    the flow field seal portion includes a seal bead portion that protrudes from the separator main body and is formed integrally with the separator main body so as to be elastically deformed by a compressive load in a separator thickness direction;
    the separator main body includes a bypass stop protrusion formed integrally therewith so as to protrude toward the membrane electrode assembly, the bypass stop protrusion being configured to prevent the reactant gas from flowing in between an end portion of the reactant gas flow field in a flow field width direction and the flow field seal portion;
    a bypass seal member is provided on a protruding end surface of the bypass stop protrusion so as to be positioned outside the electrode;
    the protruding end surface of the bypass stop protrusion includes an inner end surface facing an outer periphery of the electrode, and an outer end surface positioned outside the electrode in a state of being separated from the resin frame portion; and
    the bypass seal member is provided on the outer end surface.

2. The power generation cell according to claim 1, wherein:
    the bypass seal member is in contact with or in proximity to one of the two electrodes.

3. The power generation cell according to claim 1, wherein:
    the bypass seal member is located between the outer periphery of one of the two electrodes and an inner side portion of the seal bead portion.

4. The power generation cell according to claim 1, wherein:
    the bypass seal member is made of a rubber material.

5. The power generation cell according to claim 1, wherein:
    the bypass seal member is close to an outer surface of the resin frame portion.

6. The power generation cell according to claim 1, wherein:
    the flow field seal portion includes a resin seal member provided on a protruding end surface of the seal bead portion; and
    a constituent material for the bypass seal member is same as a constituent material for the resin seal member.

7. The power generation cell according to claim 1, wherein:
    the bypass stop protrusion comprises a plurality of bypass stop protrusions provided in a flow direction of the reactant gas in the reactant gas flow field; and
    the bypass seal member is provided on at least a bypass stop protrusion, among the plurality of bypass stop protrusions, that is closest to an inlet of the reactant gas flow field.

8. The power generation cell according to claim 1, wherein:
    the bypass stop protrusion extends so as to connect the end portion of the reactant gas flow field in the flow field width direction and an inner side portion of the seal bead portion; and
    a portion of the protruding end surface that is adjacent to the inner side portion of the seal bead portion includes a recessed portion.

9. The power generation cell according to claim 1, wherein:
    the bypass seal member is attached to an entirety of the outer end surface.

10. A power generation cell comprising: a membrane electrode assembly including an electrolyte membrane and two electrodes arranged on both sides of the electrolyte membrane; a resin frame portion arranged on an outer periphery of the membrane electrode assembly so as to project outward from the outer periphery; and two separator members arranged on both sides of the membrane electrode assembly, wherein:
    each of the two separator members includes a separator main body in a form of a metal plate;
    the separator main body includes:
    a reactant gas flow field through which a reactant gas flows along a power generation area of the electrode from one end of the separator main body toward another end thereof; and
    a flow field seal portion that surrounds the reactant gas flow field in a state of being in contact with the resin frame portion to prevent leakage of the reactant gas;
    the flow field seal portion includes a seal bead portion that protrudes from the separator main body and is formed integrally with the separator main body so as to be elastically deformed by a compressive load in a separator thickness direction;
    the separator main body includes a bypass stop protrusion formed integrally therewith so as to protrude toward the membrane electrode assembly, the bypass stop protrusion being configured to prevent the reactant gas from flowing in between an end portion of the reactant gas flow field in a flow field width direction and the flow field seal portion;
    a bypass seal member is provided on a protruding end surface of the bypass stop protrusion so as to be positioned outside the electrode;
    the bypass stop protrusion extends so as to connect the end portion of the reactant gas flow field in the flow field width direction and an inner side portion of the seal bead portion; and
    a portion of the protruding end surface that is adjacent to the inner side portion of the seal bead portion includes a recessed portion; and
    the bypass seal member is attached to a bottom surface of the recessed portion.

11. The power generation cell according to claim 10, wherein:

the bypass seal member is spaced from the inner side portion.

* * * * *